US010685276B2

(12) United States Patent
Woolf

(10) Patent No.: US 10,685,276 B2
(45) Date of Patent: Jun. 16, 2020

(54) METHOD OF MANUFACTURING A RACE BIB

(71) Applicant: Miller Products, Inc., Sebring, OH (US)

(72) Inventor: Shauna L. Woolf, Alliance, OH (US)

(73) Assignee: Miller Products, Inc., Sebring, OH (US)

( * ) Notice: Subject to any disclaimer, the term of this patent is extended or adjusted under 35 U.S.C. 154(b) by 0 days.

(21) Appl. No.: 15/954,647

(22) Filed: Apr. 17, 2018

(65) Prior Publication Data
US 2019/0318216 A1 Oct. 17, 2019

(51) Int. Cl.
G06K 19/077 (2006.01)
B32B 7/12 (2006.01)
B32B 5/02 (2006.01)
B32B 27/10 (2006.01)
B32B 38/00 (2006.01)
B32B 37/18 (2006.01)
B32B 27/32 (2006.01)

(52) U.S. Cl.
CPC ........ G06K 19/07758 (2013.01); B32B 5/022 (2013.01); B32B 7/12 (2013.01); B32B 27/10 (2013.01); B32B 27/32 (2013.01); B32B 37/182 (2013.01); B32B 38/145 (2013.01); B32B 2262/0253 (2013.01); B32B 2307/412 (2013.01); B32B 2519/02 (2013.01)

(58) Field of Classification Search
None
See application file for complete search history.

(56) References Cited

U.S. PATENT DOCUMENTS

| 7,320,432 | B2 * | 1/2008 | Sureaud ................. G06K 17/00 235/462.43 |
| 7,948,383 | B2 | 5/2011 | Lamp |
| 8,174,393 | B2 | 5/2012 | Lamp |
| 8,178,233 | B2 | 5/2012 | Bedu et al. |
| 8,395,509 | B2 | 3/2013 | Lamp |
| 8,743,661 | B2 | 6/2014 | Howell et al. |
| 2004/0006445 | A1 | 1/2004 | Paek |
| 2008/0309065 | A1 | 12/2008 | Ali et al. |
| 2008/0316032 | A1 | 12/2008 | Kia |
| 2009/0094872 | A1 | 4/2009 | Ali et al. |
| 2009/0141138 | A1 | 6/2009 | DeAngelis |
| 2009/0309735 | A1 | 12/2009 | Lamp |
| 2011/0233282 | A1 | 9/2011 | Howell |

(Continued)

Primary Examiner — Kristy A Haupt
(74) Attorney, Agent, or Firm — Sand, Sebolt & Wernow Co., LPA

(57) ABSTRACT

A race bib and a method of assembling the same. The bib includes a first and second layers with a programmable tag embedded between them. Indicia are provided on a first surface or a second surface of the first layer. A backer is positionable between the tag and the first or second layers. During assembly, a competitor number is printed on the first layer with an ink printer, a tag number correlating to or corresponding to the competitor number is encoded into the tag with a RFID tag printer. The printing and encoding can be accomplished by a combined printer. Alternatively, an optical scanner reads the printed competitor number and transmits the same to the tag printer. The second layer overlays the first layer and is thermally welded or adhesively secured to the first layer.

19 Claims, 12 Drawing Sheets

(56) References Cited

U.S. PATENT DOCUMENTS

| | | | |
|---|---|---|---|
| 2014/0319225 A1 | 10/2014 | Van Rens et al. | |
| 2015/0248605 A1* | 9/2015 | Howell | G06K 19/0725 |
| | | | 463/6 |
| 2016/0189020 A1* | 6/2016 | Duckett | G06K 1/20 |
| | | | 235/462.01 |
| 2016/0259952 A1 | 9/2016 | Van Rens et al. | |

* cited by examiner

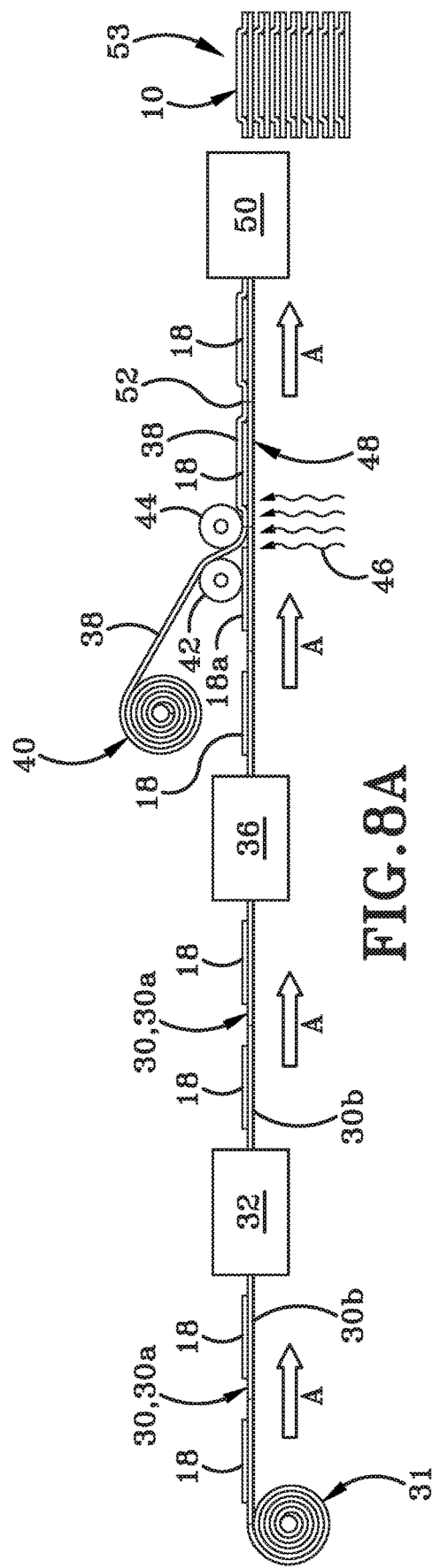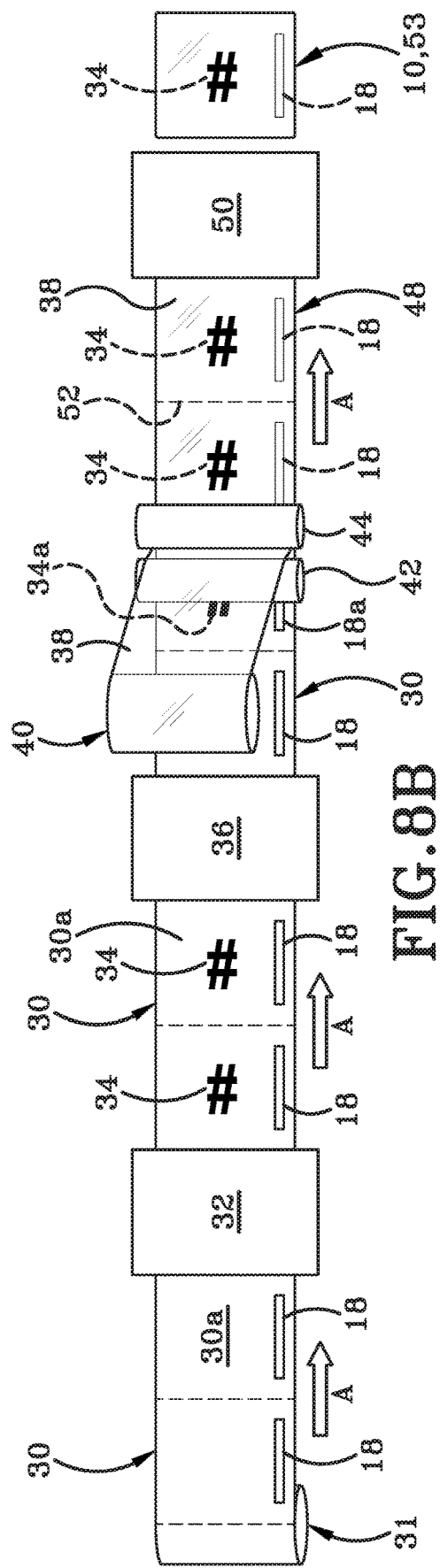

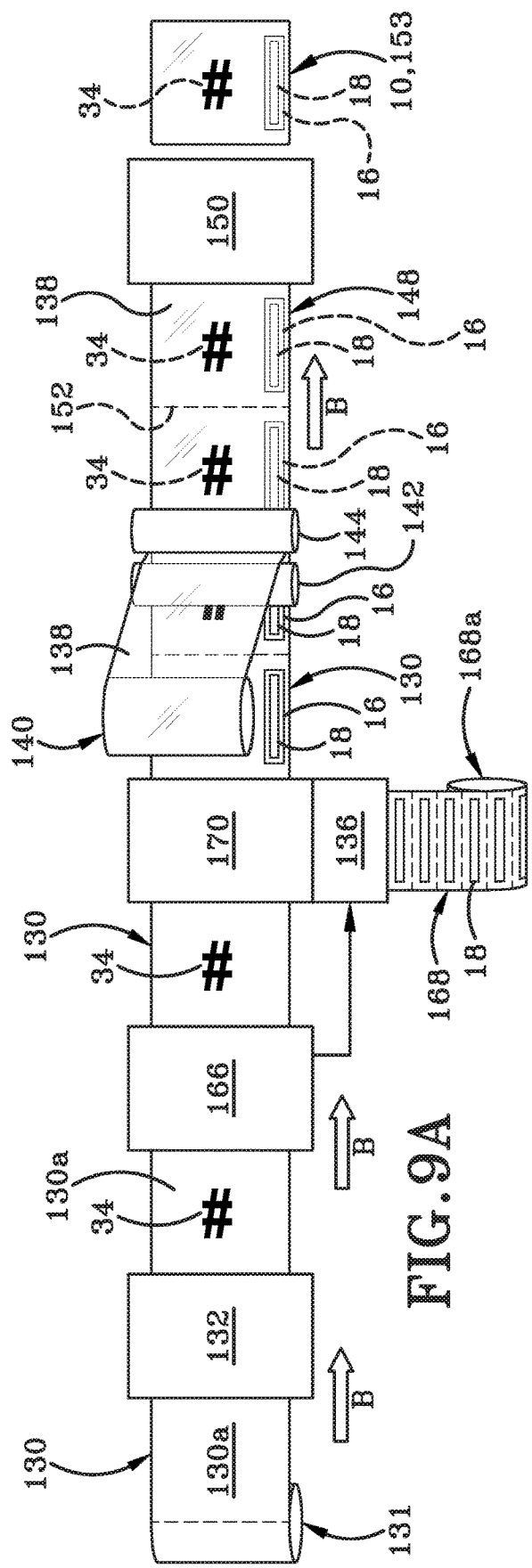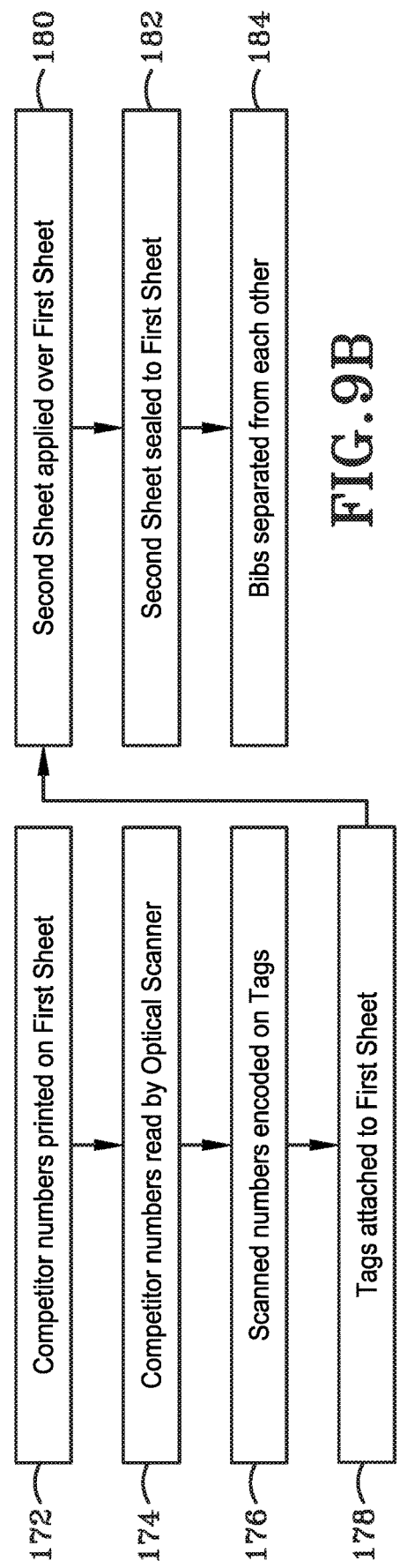

ically, the invention is directed to a race bib that includes a
METHOD OF MANUFACTURING A RACE BIB

BACKGROUND

Technical Field

This invention is directed to race bibs for use in sporting competitions where race times are recorded. More particularly, the invention relates to a race bib that includes a passive programmable tag that is attached to the bib and is activated when passing antennae on a race course. Specifically, the invention is directed to a race bib that includes a Radio Frequency Identification (RFID) tag that is programmable with information about a specific competitor and to a method for manufacturing such a race bib.

Background Information

Race bibs have been used for a number of years in competitive sports. These bibs typically comprise some type of waterproof material that is imprinted with the name of an event and a competitor number. Each competitor is assigned a race bib with a number that is subsequently matched to the competitor's name so that the placing of that individual in the competition can be determined.

Several race bibs are known in the art that include a programmable Radio Frequency Identification (RFID) tag. Such prior art includes U.S. Pat. Nos. 7,948,383; 8,174,393 and 8,395,509 issued to Shauna L. Lamp. Prior to the race, each RFID tag is programmed to include information about a specific competitor, such as their name and address along with any other pertinent information required for the race. Once received by the competitor, the race bibs are typically secured to either of the back or front of the competitor's shirt using safety pins. During the race as the runner, for example, passes special antennae located at spaced intervals along the course, the RFID tag will be activated and the time the competitor passed each antenna will be recorded stored in a computer system. When the competitor crosses the finish line, the RFID tag will again be activated and the finish time will be recorded. The order of placement of the various competitors in the race will be determined by the recorded finish times. Competitors may access the computer system at a later time and will be to see their recorded split times for the race.

U.S. Pat. Nos. 7,948,383; 8,174,393 and 8,395,509 (Lamp) discloses an RFID tag assembly that is fabricated as a separate component which is subsequently secured to a race bib. The race bib comprises a sheet of water-resistant material that has a front surface and a back surface. The competitor's number is printed on the front surface of the race bib and the back surface of the race bib is positionable against the competitor's clothing. A mounting film is provided on a small section of the front surface of the race bib and the RFID tag assembly is detachably engageable with the mounting film via an adhesive layer. The RFID tag assembly comprises a two-layered intermediate layer and a synthetic material layer that are secured to each other by a permanent adhesive layer. The RFID tag is enclosed between an outer layer and an inner layer and an adhesive layer secures the tag, the outer layer and inner layer to each other. The inner layer is also secured to the synthetic material layer. A liner strip is positioned between a portion of the intermediate layer and a portion of the adhesive layer located between the intermediate layer and synthetic material layer. The RFID tag assembly could remain attached to the front surface of the race bib or could be detached therefrom and subsequently be engaged around the competitor's shoelaces, for example.

In preparation for a large competition, race bibs are typically made available to the competitors prior to the race. The particulars of each athlete have to be associated with a specific competitor number printed on the race bib. One of the challenges in preparing race bibs that include programmable tags is when and how to program the tag with the competitor number and how to link that competitor number and tag to a particular athlete. In the past, in some instances RFID tags were delivered to race officials with each tag being preprogrammed with a unique tag number. During assembly of the race bibs for the competition, an RFID tag assembly (such as those disclosed by Lamp) might be pulled out of a stack of preprogrammed RFID tag assemblies and then each preprogrammed tag number would have to be manually stored in a computer system in association with specific competitor number on a race bib. When a particular athlete was assigned a race bib with a specific competitor number, the particulars of that athlete would have to be associated in the computing system with a race bib with a specific competitor number and the associated preprogrammed tag number.

In other instances, the tag assemblies would not each be preprogrammed with a unique tag number but, instead, the tag assemblies would need to be programmed when the race bib was assembled. Each tag assembly would be manually pulled out of a pile of tag assemblies and would be attached to a bib. The tag assembly would then be manually programmed with the competitor number printed on the race bib to with the tag assembly is attached. The name of the specific athlete being assigned a particular race bib would then be associated in the computer system with the competitor number printed on the race bib.

In each of the above instances, the compilation of the race bibs, programming of the tags on those bibs and the assigning of the competitor numbers has been a labor intensive task. If at any point the wrong tag assembly is applied to the wrong race bib, then the entire tracking system for a race breaks down.

SUMMARY

There remains a need in the art for an improved race bib including a programmable tag and a method of the same which is less labor intensive and is faster than previously known methods. The race bib and method disclosed herein address some of the issues of prior art race bibs and methods of manufacture thereof.

A race bib and a method of assembling the same are disclosed. The bib includes a first and second layers with a programmable tag embedded between them. Indicia are provided on a first surface or a second surface of the first layer. A backer is positionable between the tag and the first or second layers. During assembly, a competitor number is printed on the first layer with a digital printer, a tag number correlating to or corresponding to the competitor number is encoded into the tag with a RFID reader. The printing and encoding can be accomplished by a combined printer. Alternatively, an optical scanner reads the printed competitor number and transmits the same to the reader. The second layer overlays the first layer and is thermally welded or adhesively secured to the first layer.

In one aspect, the present disclosure may provide a race bib comprising a second layer; a tag embedded between the first layer and the second layer; wherein the first layer and second layer are permanently secured together; and wherein the tag is programmable; indicia provided on a first surface or a second surface of the first layer; wherein the indicia includes a competitor number; and wherein the tag is encoded with data and the data corresponds to the provided indicia.

In another aspect, the present disclosure may provide a method of assembling a competition race bib comprising providing a first layer; providing indicia on a first surface or a second surface of the first layer; positioning a tag on the first surface of the first layer; wherein the tag is programmable; applying a second layer over the first surface of the first layer and over the tag; fixedly securing the second layer and first layer together; and encoding the tag with data corresponding to the indicia.

In another aspect, the present disclosure may provide a method of using a race bib comprising embedding a radio frequency identification tag (RFID tag) in a waterproof or water-resistant material; providing a competitor number on the waterproof or water-resistant material; encoding the RFID tag with a tag number that correlates to the competitor number; and attaching the waterproof or water-resistant material. The method may further comprise spacing the RFID tag from a competitor's body. In particular, the RFID tag may be spaced from the competitor's body by inserting a backer or spacer between the tag and a back layer of the waterproof or water-resistant material in which the tag is embedded.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure.

FIG. 8A is a side elevation view of a first method of assembly of the race bib in accordance with the present disclosure;

FIG. 8B is a top plan view of the first method of assembly;

FIG. 9A is a top plan view of a second method of assembly of the race bib in accordance with the present disclosure;

FIG. 9B is a flow chart showing the second method of assembly;

Similar numbers refer to similar parts throughout the drawings.

DETAILED DESCRIPTION

Figure 1:
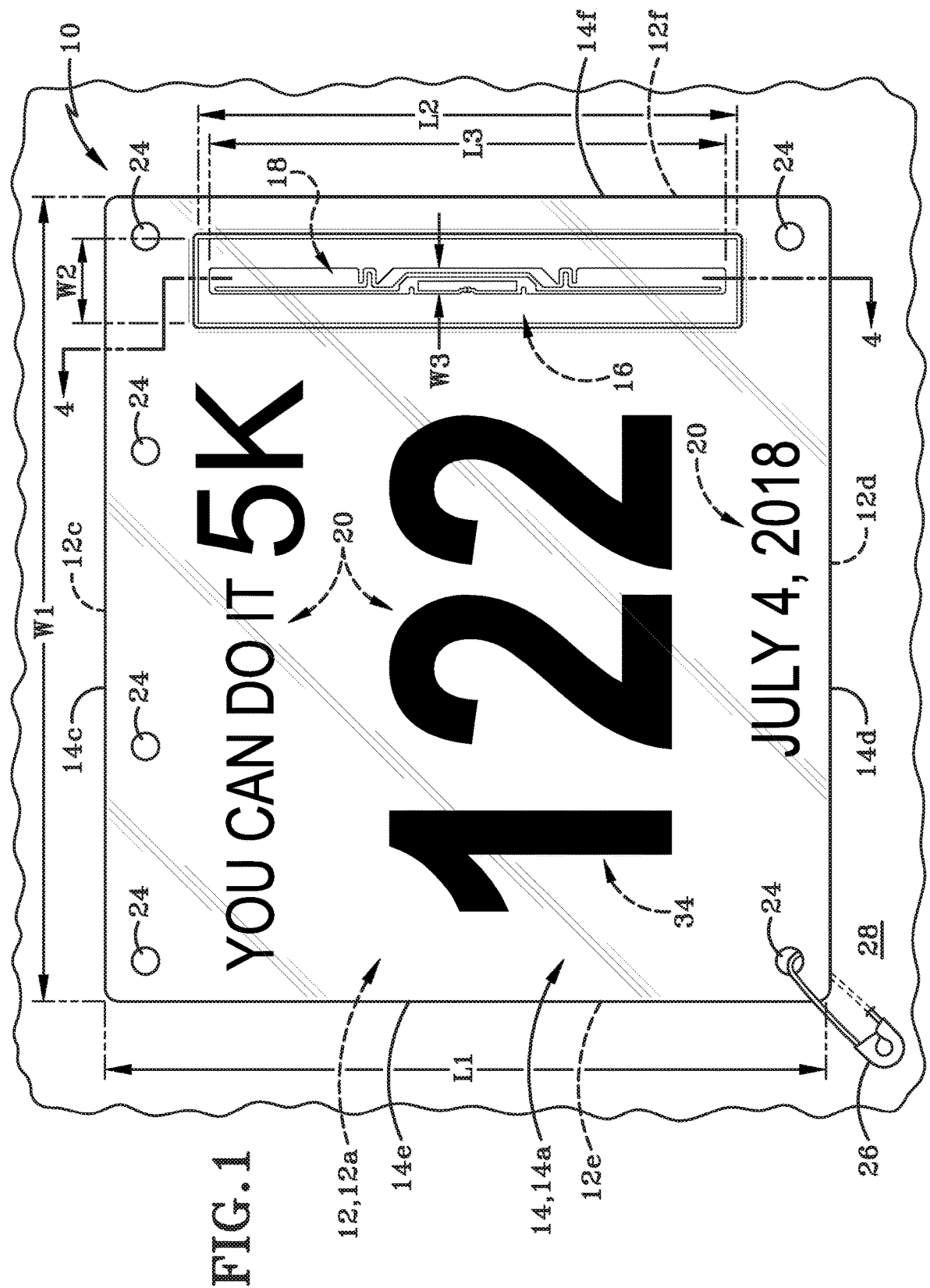
FIG. 1 is a top plan view of a first embodiment of a race bib in accordance with an aspect of the present disclosure.
Figure 2:
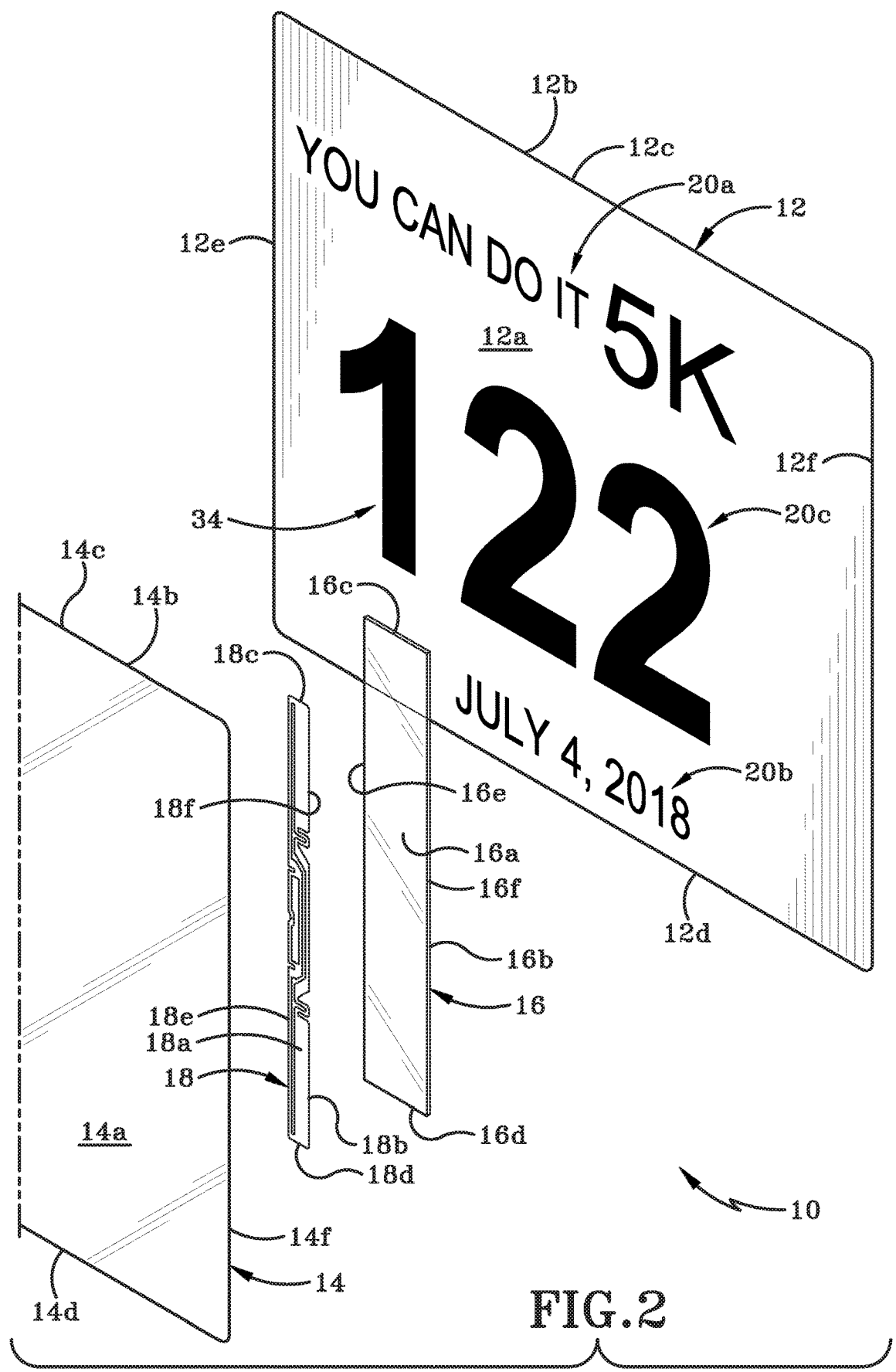
FIG. 2 is an exploded front perspective view of the race bib of FIG. 1.

Referring to FIGS. 1-4, there is shown a first embodiment of a race bib in accordance with the present disclosure, generally indicated at 10. FIG. 2 shows that bib 10 is comprised of a first layer 12, a second layer 14, a backer 16 and a programmable tag (or inlay) 18.

Referring to FIGS. 1 and 2, first layer 12 has a front surface 12a, a back surface 12b (FIG. 2), a top end 12c, a bottom end 12d, a first side 12e and a second side 12f. First layer 12 may be comprised of a synthetic material such as a flashspun high-density polyethylene fiber material. This type of material is waterproof or water-resistant in that water will not soak into the material but will simply remain beaded on its surfaces. One brand of flashspun high-density polyethylene fiber material suitable for first layer 12 may be the material sold under the trademark TYVEK®. (TYVEK® is a trademark of E. I. Du Pont De Nemours and Company of Wilmington, Del.) The inventor has also recognized that instead of a flashspun high-density polyethylene fiber, first layer 12 may, alternatively, be comprised of a synthetic paper sold under the trademark POLYLITH®. (POLYLITH® is a registered trademark of Granwell Products, Inc. of West Caldwell, N.J.)

Figure 3:
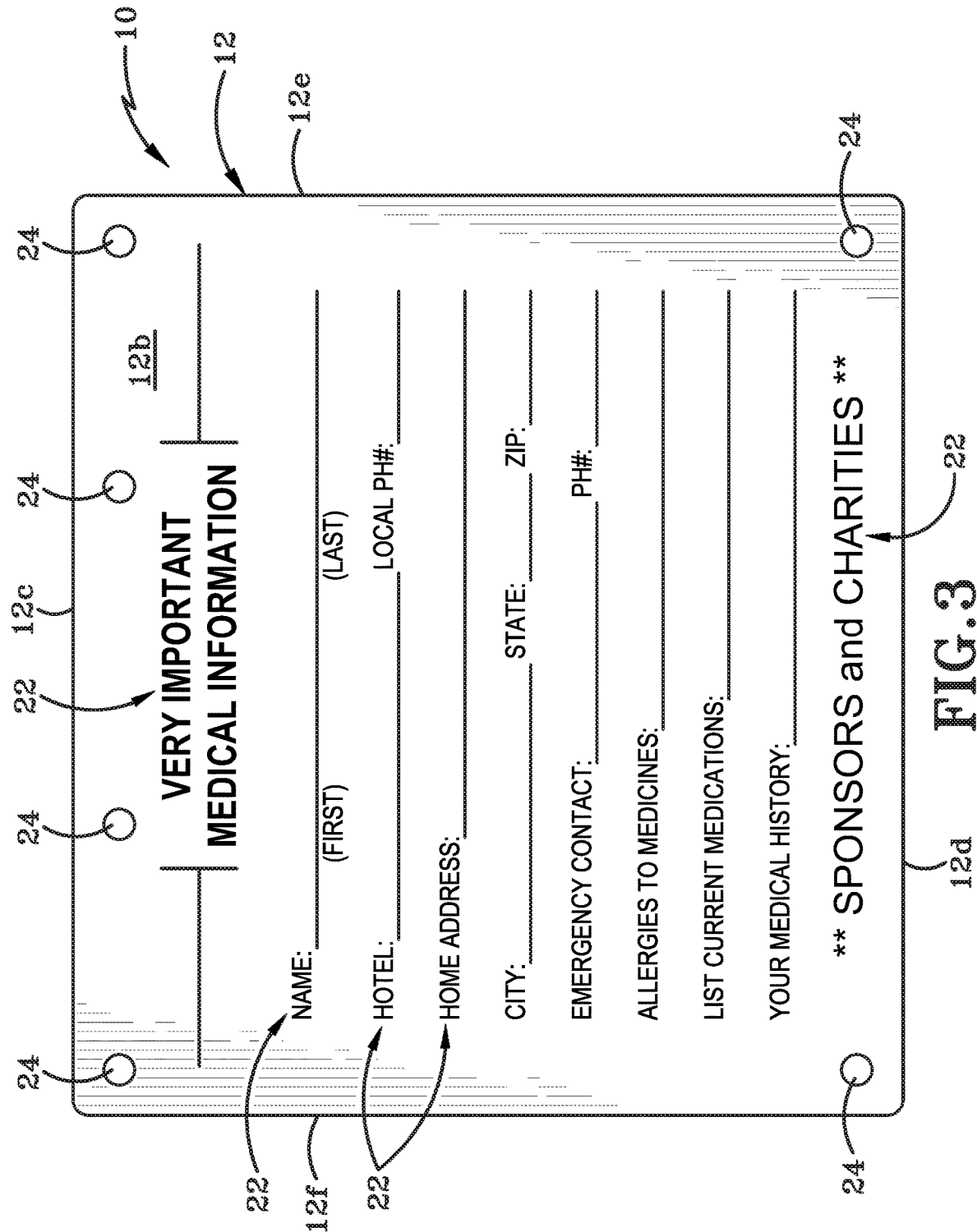
FIG. 3 is a bottom plan view of the race bib of FIG. 1.

The water-resistant material of first layer 12 is of a type suitable to be printed upon. In particular, on first surface 12a, indicia such as the name of an event 20a, an event date 20b, and a competitor number 20c may be printed onto first surface 12a. Any other indicia such as logos or pictures or any other graphic image may be printed on first surface 12a. The indicia, generally indicated by the number 20 in FIG. 1, may be printed by any one of a variety of different printing processes such as screen printing, ink printing, flexography, laser printing, offset or gravure processes etc. As indicated in FIG. 3, indicia 22 such as medical data for a particular competitor, names of charities or sponsors or another other information may be printed on back surface 12b of first layer 12.

Second layer 14 has a front surface 14a, a back surface 14b (FIG. 2), a top end 14c, a bottom end 14d, a first side 14e (FIG. 1) and a second side 14f. Second layer 14 may be comprised of a clear matt polypropylene material so that when second layer 14 is applied over first layer 12, the printing on front surface 12a of first layer 12 is readable through second layer 14. In other words, second layer may be transparent.

First layer 12 and second layer 14 may be of substantially the same length "L1" (FIGS. 1 and 2) where the length "L1" is measured from the respective top end 12c, 14c to the respective bottom end 12d, 14d. First layer 12 and second layer 14 may also be of substantially the same width "W1" (FIG. 1) where the width "W1" is measured from the respective first side 12e, 14e to the respective second side 12f, 14f. First layer 12 and second layer 14 may therefore be produced to have substantially the same dimensions, with "W1" being about 191.5 cm and "L1" being about 172 cm (i.e., "W1" being about 7.5 inches and "L1" being about 6.75 inches). First layer 12 may have a thickness "T1" measured between front surface 12a and rear surface 12b of about 6 ml. Second layer 14 may have a thickness "T2" measured between front surface 14a and rear surface 14b of about 2.45 ml.

Backer 16 has a front surface 16a, a back surface 16b, a top end 16c, a bottom end 16d, a first side 16e and a second side 16f. Backer 16 may be of any width and length that is less than or equal to "W1" and "L1". Preferably, backer 16 is substantially smaller than first and second layers 12, 14. As illustrated in FIGS. 1-4, backer 16 has a length "L2" measured from top end 16c to bottom end 16d and a width "W2" measured from first side 16e to second side 16f. Width "W2" may be about 20 ml and length "L2" may be about 127.5 ml (i.e., "W2" may be about 0.75 inches and "L2" may be about 5 inches). Backer 16 may be of any desired size and may have a thickness "T2" of about 10 ml thick. Backer 16 may be larger in length and width than tag 18. Top end 16c of backer 16 may be positioned a distance inwardly from top ends 12c, 14c of first and second layers 12, 14; and bottom end 16d of backer 16 may be positioned a distance inwardly from bottom ends 12d, 14d of the first and second layers 12, 14. Additionally, first side 16e of backer 16 may be positioned a distance inwardly from first sides 12e, 14e of first and second layers 12, 14; and second side 16f of backer 16 may be positioned a distance inwardly from first and second sides 12f, 14f of first and second layers 12, 14.

Tag 18 is a programmable tag that has a front surface 18a, a back surface 18b, a top end 18c, a bottom end 18d, a first side 18e and a second side 18f. Tag 18 may be a Radio Frequency Identification tag (RFID tag) such as the Viper R6P inlay marketed by SMARTRAC N.V of Amsterdam, The Netherlands. RFID tag 18 may be a typical passive radio-frequency identification device with an integrated circuit that can be encoded with data. RFID tag 18 does not have an internal power supply and is powered by a radio frequency emitted from an antenna provided anywhere along the race course to be completed by the competitor. RFID tag 18 may then backscatter the emitted frequency to the antenna which provides the identification and encoded data of the RFID tag. While the RFID tag 18 of the present invention has been described as a passive tag, it is within the spirit and scope of the present invention as claimed to incorporate an active, semi-active, or other powered RFID tag. Further, while the present invention is described incorporating an RFID tag, any suitable programmable tag, or chip may be used.

Tag 18 has a length "L3" measured from top end 18c to bottom end 18d and a width "W3" measured from first side 18e to second side 18f. As is evident from FIG. 1, length "L1" is greater than length "L2" which in turn is greater than length "L3". Width ""W1" is wider than width "W2" which in turn is greater than width "W3".

When race bib 10 is assembled (as will be discussed later herein), first and second layers 12, 14 are positioned so that top ends 12c, 14c are aligned with each other; bottom ends 12d, 14d are aligned with each other; first ends 12e, 14e are aligned with each other, and second ends 12f, 14f are aligned with each other. FIG. 1 shows that a plurality of holes 24 are punched through first layer 12 and second layer 14. Holes 14 are placed at intervals proximate the outer perimeter of bib 10 so that one or more fasteners (such as safety pin 26) may be used to secure bib 26 to a competitor's clothing 28. In particular, as illustrated in FIG. 1, when race bib 10 is secured to clothing 28, back surface 12b of first layer 12 is located proximate the front surface of the clothing 18 and front surface 14a of second layer 14 forms the outermost surface of the race bib 10.

Figure 4:
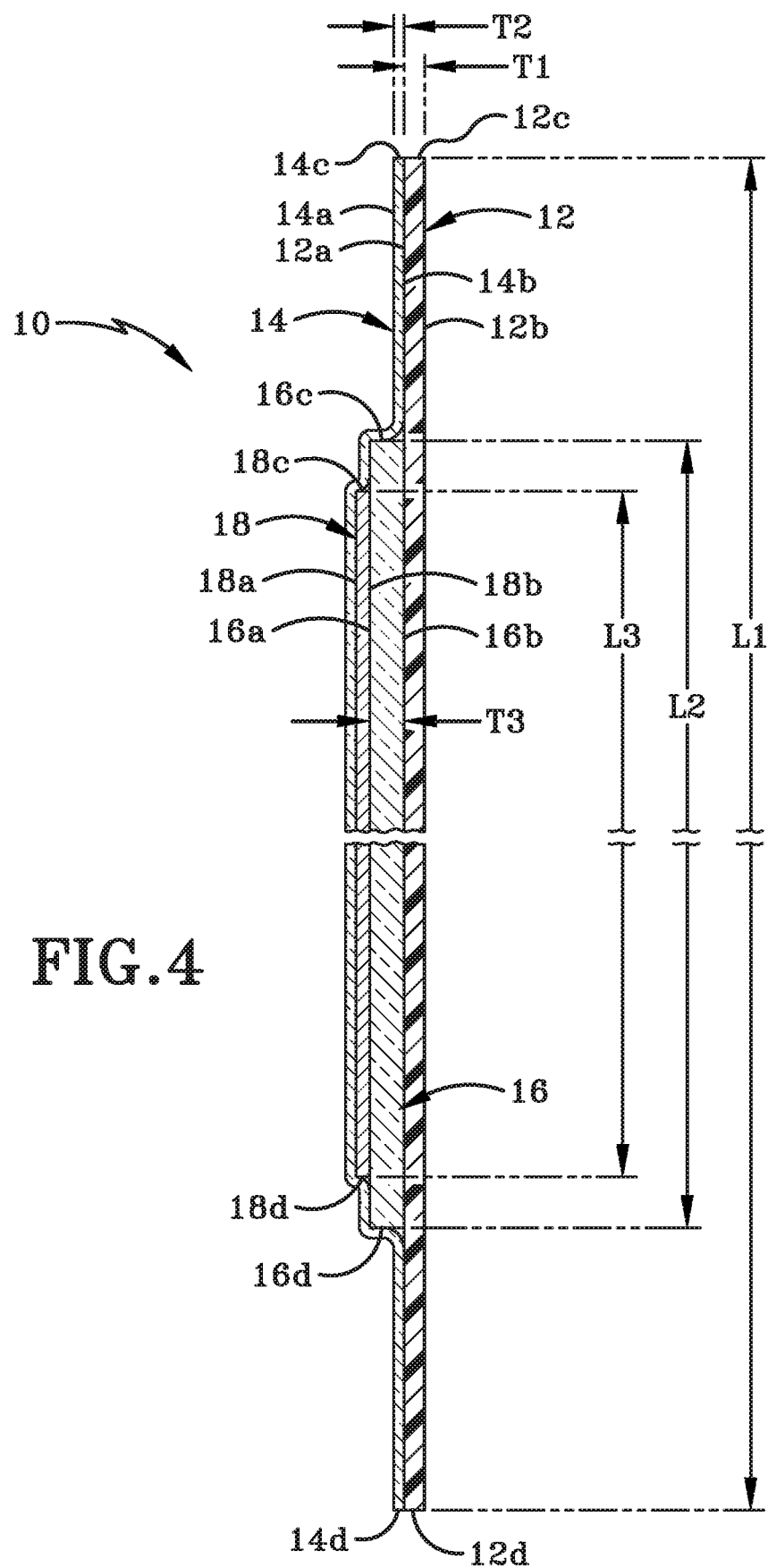
FIG. 4 is a longitudinal cross-section of the race bib taken along line 4-4 of FIG. 1.

As is evident from FIG. 4, backer 16 is placed on front surface 12a of first layer 12, back surface 18b of tag 18 is placed on front surface 16a of backer 16 and back surface 14b of second layer 12 is placed over front surface 18a of tag 18 and over the portion of front surface 12a of first layer 12 that is not covered by backer 16 and tag 18. Second layer 12 thus forms the front surface of race bib 10 and covers tag 18 and backer 16. As will be discussed later herein second layer 14 is bonded to first layer 12 by any suitable method such as heat sealing or by way of an adhesive. Tag 18 and backer 16 are therefore embedded within race bib 10. Tag 18 therefore cannot be disengaged in any way from race bib 10 and remains fully protected by the waterproof or water-resistant first and second layers 12, 14 at all times. Further advantages of race bib 10 will be discussed later herein.

It should be noted that placing backer 16 between tag 18 and first layer 12 helps to separate the competitor's body from tag 18 and thereby aids in cutting down potential interference with the functioning of tag 18 that might be caused by the competitor's body's. The thickness "T3" of backer 16 (about 10 ml) has been found to be sufficient to protect tag 18 from interference from the competitor's body.

Figure 5:
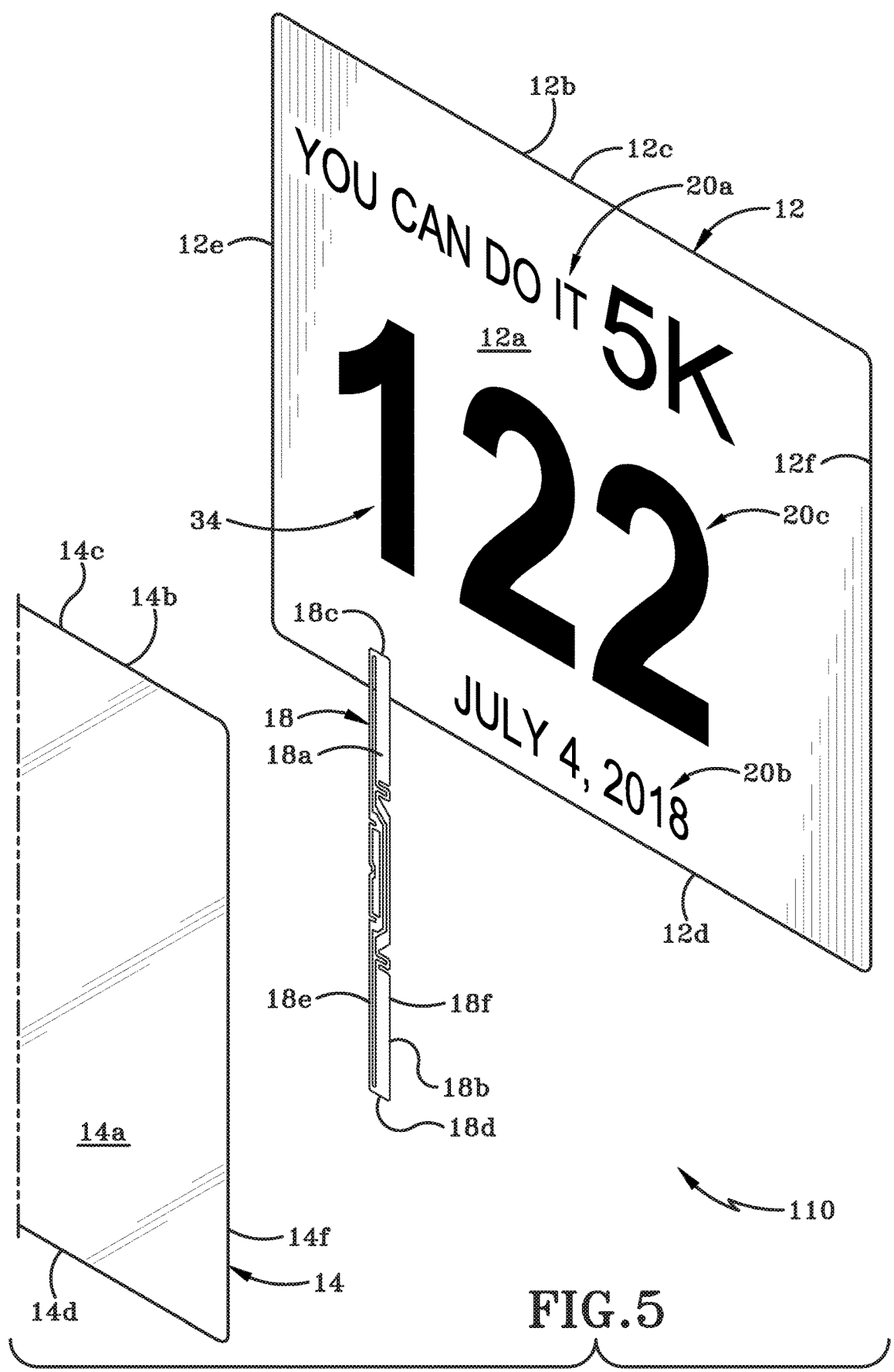
FIG. 5 is an exploded front perspective view of a second embodiment of a race bib in accordance with an aspect of the present disclosure.

FIG. 5 shows a second embodiment of race bib in accordance with the present disclosure, generally indicated at 110. Race bib 110 is comprised of first layer 12, second layer 14, and tag 18 that are all substantially identical in structure and function to first layer 12, second layer 14 and tag 18 of race bib 10. The difference between race bib 10 and race bib 110 is that backer 16 is omitted. In other words the back surface 18b of tag 18 is in abutting contact with front surface 12a of first layer 12 and back surface 14b of second layer 14 overlays front surface 18a of tag 18 and the portion of front surface 12a of first layer 12 that is not covered by tag 18. Again second layer 14 is bonded or otherwise secured to first layer 12 so that tag 18 is embedded within bib 110.

Figure 6:
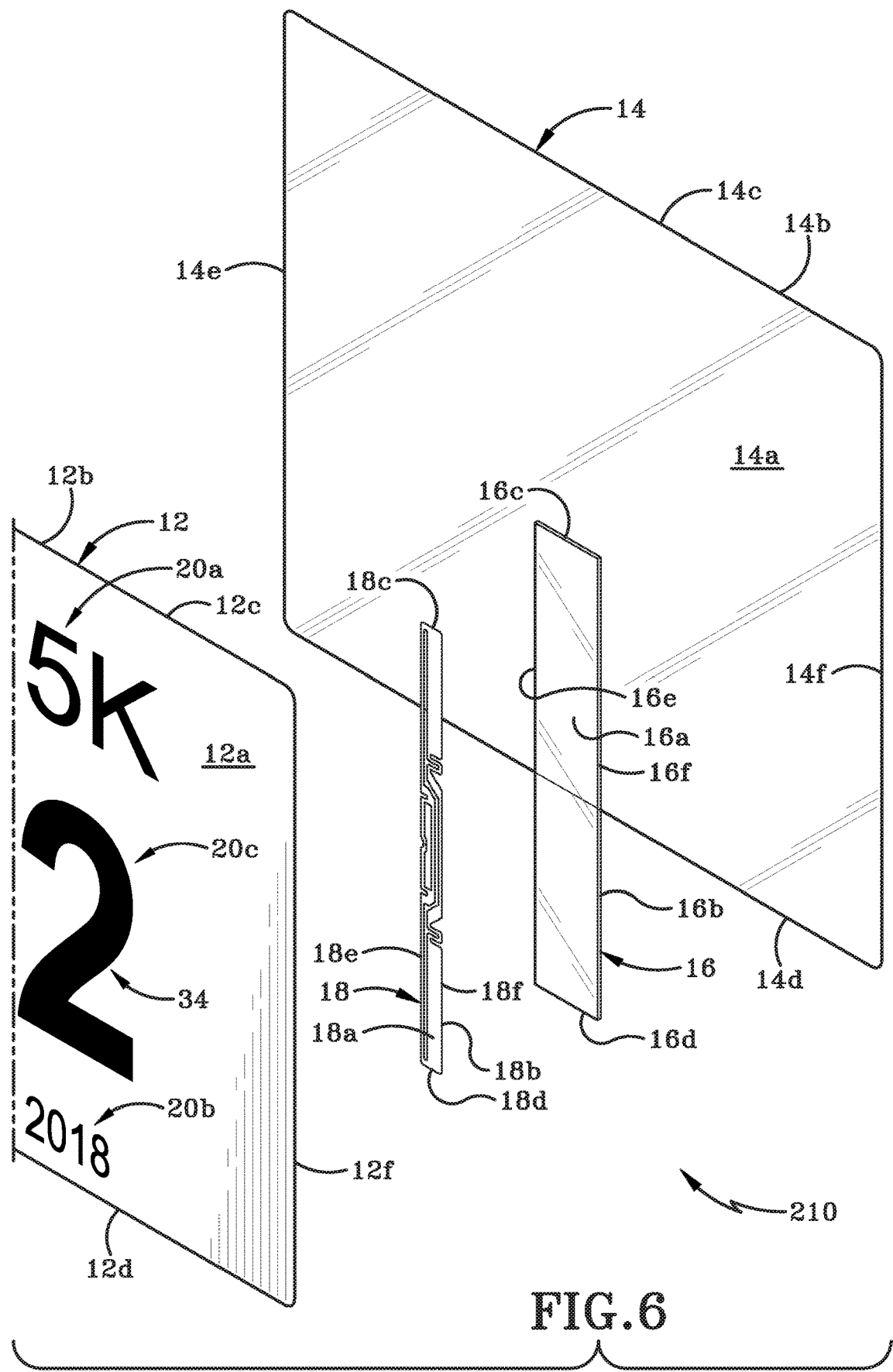
FIG. 6 is an exploded front perspective view of a third embodiment of a race bib in accordance with an aspect of the present disclosure.

FIG. 6 shows a third embodiment of race bib in accordance with the present disclosure, generally indicated at 210. Race bib 210 is comprised of a first layer 12, second layer 14, a backer 16, and a tag 18 that are all substantially identical in structure and function to the first layer 12, second layer 14, backer 16 and tag 18 of race bib 10. The difference between race bib 210 and race bib 10 is that the positions of the various layers within bib 210 are switched relative to the layering of race bib 10. Second layer 14 is placed in a position that will make back surface 14b the surface that will be placed against a competitor's clothing. Back surface 16b of backer 16 is placed against front surface 14a of second layer 14, back surface 18b of tag 18 is placed against front surface 16a of backer 16 and back surface 12b of first layer 12 is placed against front surface 18a of tag 18. First layer 12 therefore overlays tag 18, backer 16, and the part of front surface 14a of second layer 14 not covered by tag 18 and backer 16. First and second layers 12, 14 are sealed or otherwise bonded or secured together so that tag 18 is embedded within bib 210. It should be noted that in this instance, second layer 14 may be comprised of clear polypropylene so that any indicia 22 applied to back surface 12b of first layer 12 are readable through second layer 14. If no indicia 22 are applied to back surface 12b, second layer 14 may still be comprised of the clear matte polypropylene or may otherwise be comprised of an opaque material through which the backer 16, tag 18 and back surface 12b of first layer 12 cannot be seen.

Figure 7:
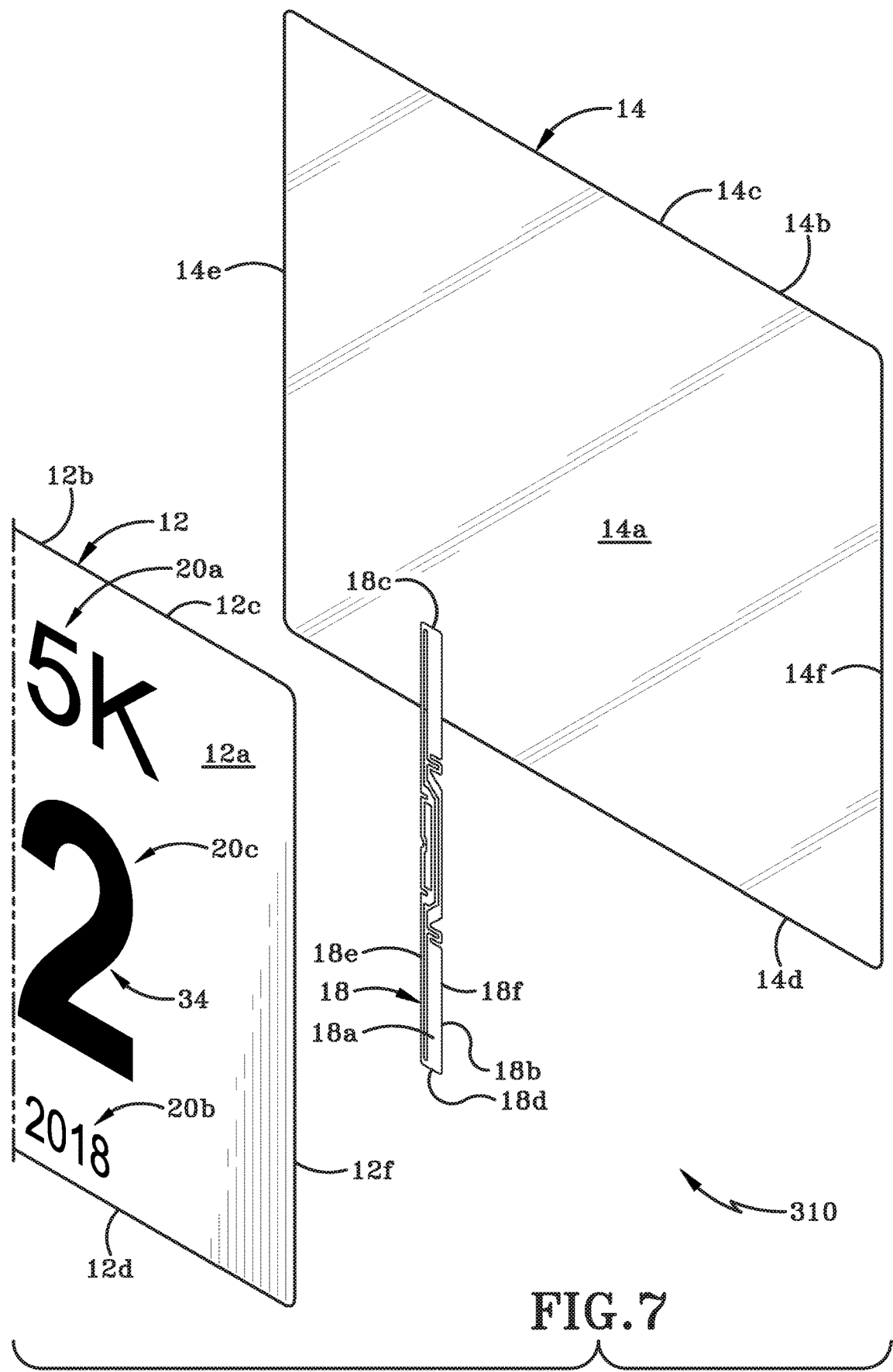
FIG. 7 is an exploded front perspective view of a fourth embodiment of a race bib in accordance with an aspect of the present disclosure.

FIG. 7 shows a fourth embodiment of race bib in accordance with the present disclosure, generally indicated at 310. Race bib 310 differs from race bib 210 in that the backer 16 is omitted. In race bib 310, second layer 14 is placed in a position that will make back surface 14b the surface that will be placed against a competitor's clothing. Back surface 18b of tag 18 is placed against front surface 14a of second layer 14 and back surface 12b of first layer 12 is placed against front surface 18a of tag 18. First layer 12 therefore overlays tag 18 and the part of front surface 14a of second layer not covered by tag 18. First and second layers 12, 14 are sealed or otherwise bonded or secured together so that tag 18 is embedded within bib 310. It should be noted that in this instance, second layer 14 may be comprised of clear polypropylene so that any indicia 22 applied to back surface 12b of first layer 12 are readable through second layer 14. If no indicia 22 are applied to back surface 12b, second layer 14 may still be comprised of the clear matte polypropylene or may otherwise be comprised of an opaque material through which the tag 18 and back surface 12b of first layer 12 cannot be seen.

Referring to FIGS. 8A and 8B there is shown a first method of assembly of a plurality of race bibs. First 8A through 8C illustrated the assembly of race bibs 110 by way of example only. The first assembly method can be applied to assembly of race bibs 10, 210, or 310 with slight modifications, as will be described later herein.

In the first method of assembly, an elongate first sheet of material 30 is unwound from a roll 31 and is moved along a production line in a direction indicated by arrow "A" (FIGS. 8A and 8B). A plurality of tags 18 are positioned on an upper surface 30a of material 30 with tags 18 being spaced at intervals from each other along upper surface 30a. The first sheet of material 30 is fed through a printer 32 that prints a series of sequential competitor numbers 34 onto an upper surface 30a of first sheet 30. Numbers 34 are spaced at intervals away from each other along upper surface 30a. Each number 34 is located to correspond with a location of one of the tags 18, as can be seen in FIG. 8B. The sheet of material 30 with printed competitor numbers 34 and associated tags 18 thereon then passes through an RFID reader 36. In the RFID reader 36, a series of sequential tag numbers is encoded into the series of tags 18 as the first sheet 30 moves through reader 36. The encoded tag numbers correspond to the printed competitor numbers 34. So, for instance if number 34a is the competitor number "122" that has been printed on a particular section of upper surface 30a, then a tag number will be encoded into the associated tag 18a as first sheet 30 moves through reader 36. The encoded data typically is an event code, timer code and bib number and may be a hexadecimal version of a decimal value. (It will be understood that the competitor number 34 and the tag number encoded into the associated tag 18 do not have to be identical; instead, they simply have to correspond in some known manner.)

It will be understood that in some instances a custom bib that includes the competitor's name printed thereon may also be provided if desired.

The first sheet 30 with printed competitor numbers 34 and encoded tags 18 then has a second sheet of material 38 placed thereover. Second sheet of material 38 may be unwound from a roll 40 and be passed over a top of a first roller 42 and under a second roller 44. Second sheet 38 overlays upper surface 30a and therefore also overlays competitor numbers 34 and encoded tags 18. As first sheet of material 30 is passes under second roller 44, heat 46 may be applied thereto. The heat 46 in combination with pressure applied by second roller 44 heat welds or thermally bonds first sheet 30 and second sheet 38 together. First and second sheets 30, 38 therefore a bonded or sealed to each other and tags 18 are embedded therebetween. Alternatively, instead of heat 46 being applied to secure first and second sheets 30, 38 together, an adhesive may be applied between the sheets 30, 38 prior to them passing under second roller 44. The bonded first and second sheets 30, 38 with tags 18 embedded therebetween form an elongate sheet of material 48 that is then passed through a cutter assembly 50 that separates individual race bibs 110 from sheet 48 at spaced apart cutting intervals or points 52. (In some instances, lines of weakness may be pre-formed at cutting intervals 52 along sheets 30 and 38 in which case the unrolling of sheets 30 and 38 from rolls 31 and 40, respectively, must be synchronized.)

The printed and programmed stack of separated race bibs 110 may then stacked 53, packaged and ultimately delivered to race officials. Race officials will assign a competitor number 34 to each competitor. Since RFID tags 18 have each been preprogrammed or encoded with a tag number that corresponds to a competitor number 34 on a particular bib 110, a particularly labor intensive task is removed from the race officials; i.e., the task of trying to program and correctly match a tag to each competitor number. Additionally, because tags 18 are encoded at the time that bib 110 is assembled and are embedded within bib 110, it is impossible for a particular tag to be matched to an incorrect competitor number; it is also impossible for the wrong time to be ascribed to a wrong competitor number during a race.

It should be understood that during printing of competitor numbers 34 by printer 32, printing of information on bottom surface 30b may also occur. The information in question may be the type of information shown in FIG. 2.

As indicated previously, FIGS. 8A and 8B show the production of bib 110 so in this instance, first sheet of material 30 will become the first layer 12 of the bibs 110 and the second sheet of material 38 will become second layer 14. Consequently, the first sheet of material 30 may be a synthetic material such as TYVEK® or POLYLITH® and the second sheet of material 38 may be a polypropylene material.

The first assembly method shown in FIGS. 8A and 8B may also be used to fabricate bib 310. The steps may be identical except that instead of competitor numbers 34 being printed on upper surface 30a of first sheet of material 30, those competitor numbers 34 will be printed on lower surface 30b thereof. The indicia 22 of FIG. 2 may be printed on upper surface 30a or the upper surface 30a may be left unprinted.

The first assembly method shown in FIGS. 8A and 8B may also be used to produce race bibs 10 and 210. In these instances, instead of just the tags being placed on first sheet of material 30 and being covered with second sheet 38, the tags 18 and associated backers 16 will be placed on upper surface 30a. With race bibs 10, the backer 16 will contact upper surface 30a and the tags 18 will overlay the backers 16. In race bibs 210, the tags 18 will contact upper surface 30a and the backers 16 will overlay tags 18. The rest of the assembly method is the same as is illustrated in FIGS. 8A and 8B.

Figure 8C:
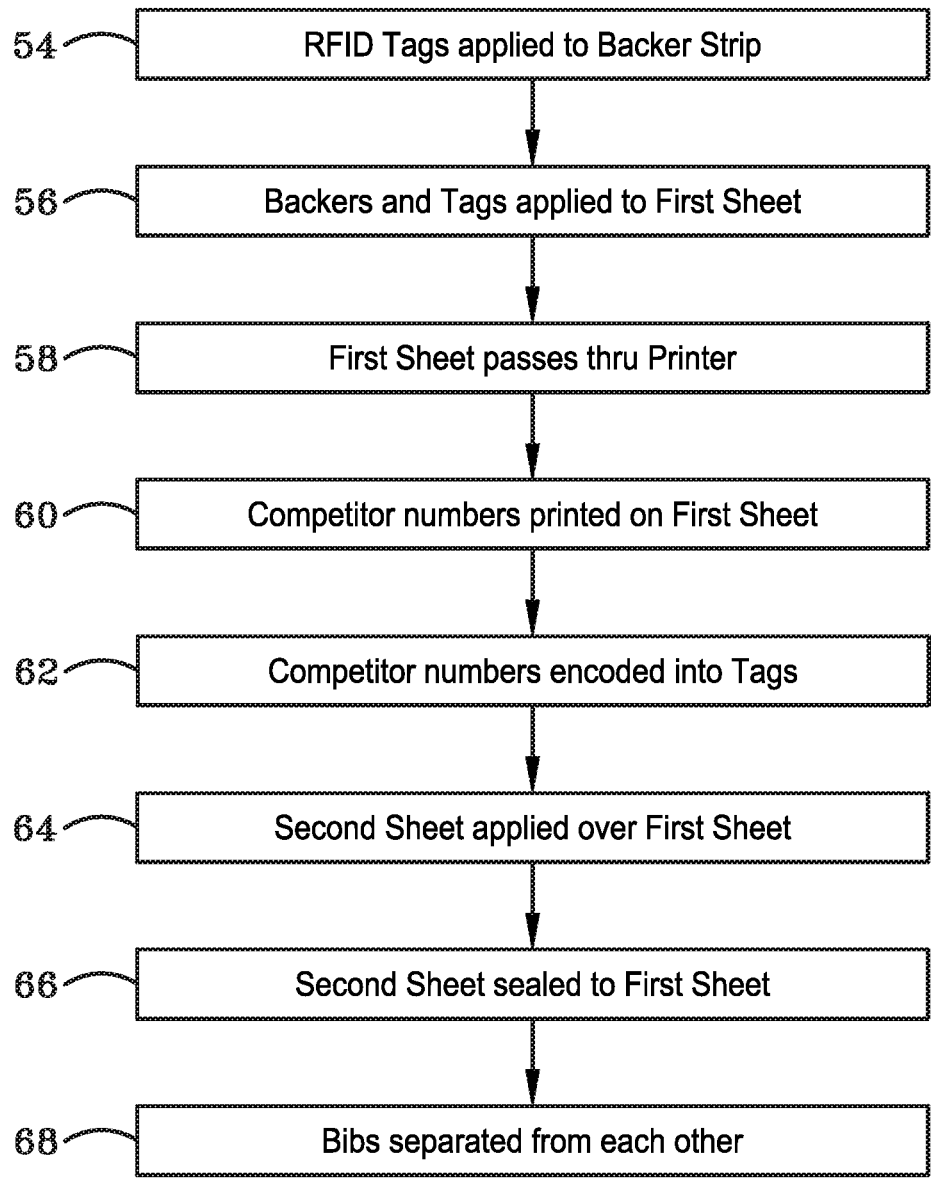
FIG. 8C is a flow chart showing the first method of assembly of the race bib.

FIG. 8C shows a flow chart setting out the steps of the first method of assembly for race bibs 10. In a first step 54 the tags 18 may be applied to associated backers 16. In a second step 56, backers 16 with tags 18 attached are applied to upper surface 30a of first sheet of material 30. When producing race bibs 10, backers 16 are placed in contact with upper surface 30a of first sheet of material 30 so that tags 18 are spaced from upper surface 30a. (When producing race bibs 210, tags 18 are placed in contact with upper surface 30a.) In a third step 58 of the method of assembly, first sheet of material 30 with backers 16 and associated tags 18 attached passes into a printer 32. In a fourth step 60 competitor numbers 34 and other indicia 20 and 22, as required, are printed onto first sheet 30 (onto one or both of upper surface 30a and lower surface 30b). In a fifth step 62, the first sheet 30 passes through an RFID reader 36, and tag numbers are encoded into tags 18. Each tag number corresponds to or correlates with an associated competitor number 34. In other words, the same numeral may be printed on the upper surface 30a as is encoded into tag 18 or a numeral related in some manner to the numeral printed on the upper surface 30a may be encoded into the tag. In a sixth step 64, a second sheet of material 38 is applied over the upper surface 30a of the first sheet of material 30. In a seventh step 66, the second sheet of material 38 is bonded, sealed and/or affixed to the first sheet of material 30 in any suitable manner. In an eighth step 68, the bonded sheets of material 30, 38 pass through a cutter assembly 50 and the individual bibs 10 are separated from each other. As indicated previously, the separated bibs 10 are then stacked, packaged and shipped to race officials.

The flow chart of FIG. 8C applies equally to the production of race bibs 110 and 310 except that step 54 is omitted and step 56 is modified so that only tags 18 are applied to first sheet 30.

It will further be understood the first assembly method illustrated in FIGS. 8A through 8C may be changed in that that first sheet of material 30 may pass through RFID reader 36 before being passed through printer 32. In other words, tags 18 may be encoded with series of tag numbers and then after that an associated series of sequential competitor numbers 34 may be printed onto upper surface 30a of sheet 30.

FIGS. 9A and 9B set out a second assembly method that for the purposes of illustration only is a second assembly method for race bibs 10. The second assembly method can be applied to assembly of race bibs 110, 210, or 310 with slight modifications, as will be described later herein.

The second assembly method shows movement along a production line in the direction of arrows "B". FIG. 9A shows a first sheet of material 130 being unrolled off a roll 131. Sheet 130 passes through a printer 132 that prints a sequence of competitor numbers 34 and other indicia 20 as desired onto upper surface 130a. It will be understood that printer 132 may also print other indicia 22 (FIG. 3) on a lower surface of first sheet 130. The competitor numbers 34 may be printed a series of sequential numbers.

The first sheet of material 130 with the sequence of competitor numbers 34 printed thereon passes under an optical scanner 166. Optical scanner 166 is in communication (wireless or otherwise) with RFID reader 136. Scanner 166 reads the series of competitor numbers 34 passing under it and conveys that information to RFID reader 136. A backer strip 168 that includes a plurality of backers 16 and tags 18 thereon at spaced intervals, unwinds from a roll 168a and passes through RFID reader 136. RFID reader 136 encodes a series of tag numbers that correlate to the scanned competitor numbers 34 into the tags 18. The encoded tags and first sheet 130 with printed competitor numbers 34 pass into a tag applicator 170. Tag applicator 170 applies each encoded tag 18 onto the upper surface 130a of first sheet of material 130.

A second sheet of material 138 is unwound from a roll 140, is passed over a top of a first roller 142 is positioned over upper surface 130a of first sheet 130. The sheets 130, 138 pass under a second roller 144 and become bonded together through the application of heat 146 and pressure from second roller 144. Alternatively, instead of heat, first and second sheets 130, 138 may have an adhesive applied between them prior to passing under roller 144 and the sheets 130, 138 thereby become adhesively secured together and form sheet 148. Tag 18 is thus embedded between first sheet 130 and second sheet of material 138.

The bonded sheet of material 148 passes through a cutter assembly 150 that separates the plurality of race bibs 10 from each other along separation or cutting lines 152. The printed and programmed stack 153 of separated race bibs 10 may then be delivered to a race official. Since RFID tags 18 are each programmed with a tag number that is the same as the optically read printed number 34 on the associated race bib 10 prior to delivery to the race officials, a particularly labor intensive task is removed from the race officials; i.e., the task of trying to correctly match a tag number to a competitor number. It is also impossible for the wrong tag to be matched to a competitor number since the programming step is accomplished immediately after the printing of the competitor numbers on the bibs and the programming occurs in the same sequence as the printing of the competitor numbers.

It will be understood that tag applicator 170 may apply backer 16 and tag 18 onto upper surface 130a with the backers 16 in contact with upper surface 130a (to ultimately form bibs 10) or with tags 18 in contact with upper surface 130a and backer 16 spaced from upper surface 130a (to ultimately form bibs 210). Alternatively to form bibs 110 or 310 or tags 18 may be directly applied from backer strip 168 without any backers 16 attached.

FIG. 9B shows a flow chart that sets out a number of steps included in the second assembly method. In a first step 172, the first sheet of material 130 is passed through a printer 132 and a series of competitor numbers 34 are printed onto upper surface 130a. In a second step 174, the series of competitor numbers 34 are read by an optical scanner 166. The optical scanner 166 is operatively engaged with an RFID reader 136. In a third step 176, a backer strip 168 including a plurality of backers 16 and associated tags 18 passes into an RFID reader 136. RFID reader 136 encodes the tags 18 with tag numbers that correlate or correspond to the series of competitor numbers 34 read by optical scanner 166 and transmitted to reader 136. In a fourth step 178, first sheet of material 130 and backer strip 168 with encoded backers 16 and tags 18 pass into a tag applicator 170. Tag applicator 170 applies the backers 16 and encoded tags 18 to upper surface 130a of first sheet of material 130. (If race bibs 10 are being produced, the backers 16 will be placed in contact with upper surface 130a; if race bibs 210 are being produced, the tags 18 will be placed in contact with upper surface 130a.) In a fifth step 180, a second sheet of material 138 is applied over the upper surface 130a of the first sheet of material 130, covering the backers 16 and encoded tags 18. In a sixth step 182, the second sheet of material 138 is bonded and/or sealed to the first sheet of material 130 when passed under roller 144 and upon application of heat or an adhesive. In an seventh step 184, the bonded and/or sealed sheets of material 130, 138 (now single sheet 148) passes through a cutter assembly 150 and the individual bibs 10 are separated from each other, are formed into a stack 153 and packaged for shipping to race officials.

It should be understood that if race bib 110 or 310 is being produced utilizing the steps above, only tags 18 will be applied to upper surface 130a during the fourth step 178.

In the production of any of race bibs 10, 110, 210, or 310 a small quantity of adhesive may be utilized to keep backers 16 or tags 18 in position on upper surface of the first sheet of material prior to overlayment with the second sheet of material.

Figure 10A:
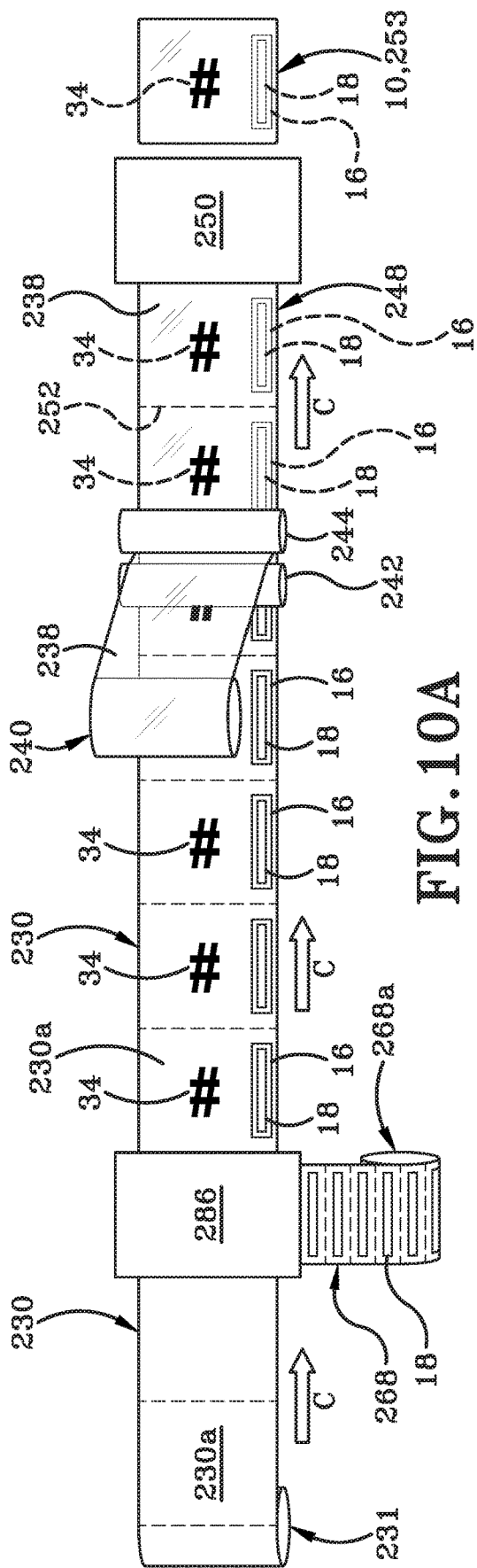
FIG. 10A is a top plan view of a third method of assembly of the race bib in accordance with the present disclosure.
Figure 10B:
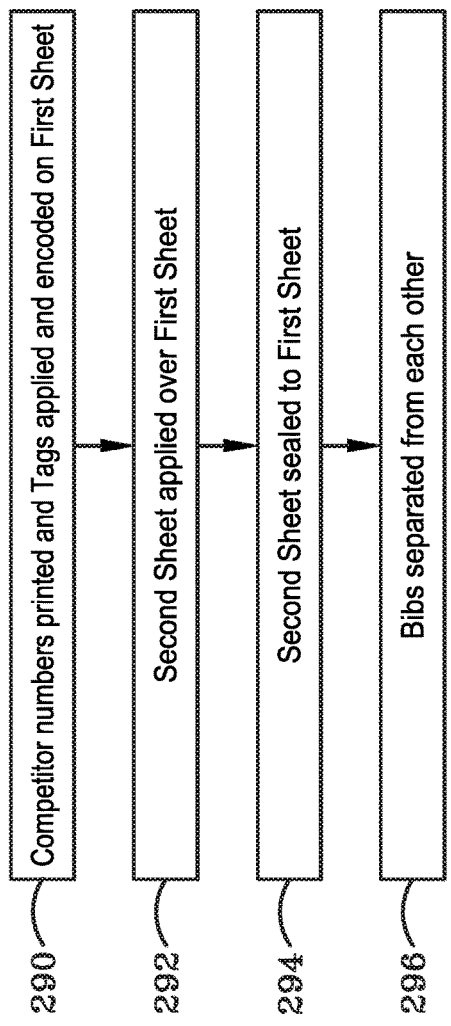
FIG. 10B is a flow chart showing the third method of assembly.

FIGS. 10A-10B set out a third assembly method for producing race bibs. The assembly method shows, in particular, the assembly of race bibs 10 but can be applied to assembly of race bibs 110, 210, or 310 with slight modifications, as will be described later herein.

The production line for the third assembly method moves in the direction of arrow "C" in FIGS. 10A and 10B. In this third assembly method a first sheet of material 230 is moved in the direction of arrow "C" off a roll 231 and into a combination ink and RFID printer 286. Printer 286 is capable of printing a sequence of competitor numbers and of encoding or programming a series of RFID tags 18 with tag numbers that correlate or correspond to the competitor numbers. Printer 286 is further capable of applying the tags 18 and associated backers 16 to upper surface 230a of first sheet of material 230. The printing, encoding, and applying steps can occur in any order and some or all of these three steps may occur substantially simultaneously. A blank first sheet of material 230 enters printer 286 at one end and the first sheet of material 230 exiting printer 286 has competitor numbers 34, and other indicia 20 and/or 22 printed on both upper and/or lower surfaces of first sheet 230 and also has encoded tags 18 applied thereto.

A second sheet of material 238 is unwound from a roll 240 and is passed over a top of a first roller 242 and then under a second roller 244. The first sheet of material 230 is passed under rollers 242 and 244 and heat 246 is applied to first and second sheets 230, 238 and, with the application of pressure from second roller 244, first and second sheets 230, 238 are thermally welded together. Alternatively, instead of heat being applied to first and second sheets 230, 238, an adhesive may be applied between first and second sheets 230, 238 prior to passing under roller 244 and the sheets 230, 238 will thereby become adhesively secured together. The bonded sheet 248 exiting from under second roller 244 has tag 18 is embedded between first sheet 230 and second sheet of material 238.

The bonded sheet of material 248 then passes through a cutter assembly 250 that separates the plurality of race bibs 10 from each other along separation or cutting lines 252. The printed and programmed stack 253 of separated race bibs 10 may then be delivered to a race official.

It will be understood that printer 286 may apply backer 16 and tag 18 onto upper surface 230a with the backers 16 in contact with upper surface 230a (to ultimately form bibs 10) or with tags 18 in contact with upper surface 230a and backer 16 spaced from upper surface 230a (to ultimately form bibs 110). In other instances, the backers 16 may be omitted and tags 18 may be applied directly to upper surface 230a (to ultimately form bibs 110 or 310).

FIG. 10C shows a flow chart illustrating the third assembly method. The third assembly method includes a first step 290 where first sheet of material 230 is fed off a roll 231 and into a combined RFID and digital printer 286 which then encodes tags 18 and applies them to upper sheet 230a and prints competitor numbers 34 onto upper surface 230a. In a second step 292, a second sheet of material 238 is applied over upper surface 230a of first sheet 230. In a third step 294, second sheet of material 238 is bonded or sealed to first sheet of material 230 utilizing rollers 242, 244 and heat or adhesive, thereby sealing the two sheets of material 230, 238 together into a single sheet 248. In a fourth step 296, the bonded and/or sealed sheet 248 is passed through a cutter assembly 250 and the bibs 10 are separated from each other, are stacked 253 and then shipped to race officials.

Once the stack 53, 153, or 253 of bibs 10, 110, 210 is received by race officials, the officials will sequentially select each bib from the stack and will enter the competitor number into their computing system for tracking the race. Each different competitor number 34 is assigned to one the race competitors and is linked to the individual competitor's personal information in the race computer system. From that point on, the competitor number 34 is used to identify that individual competitor.

Figure 11:
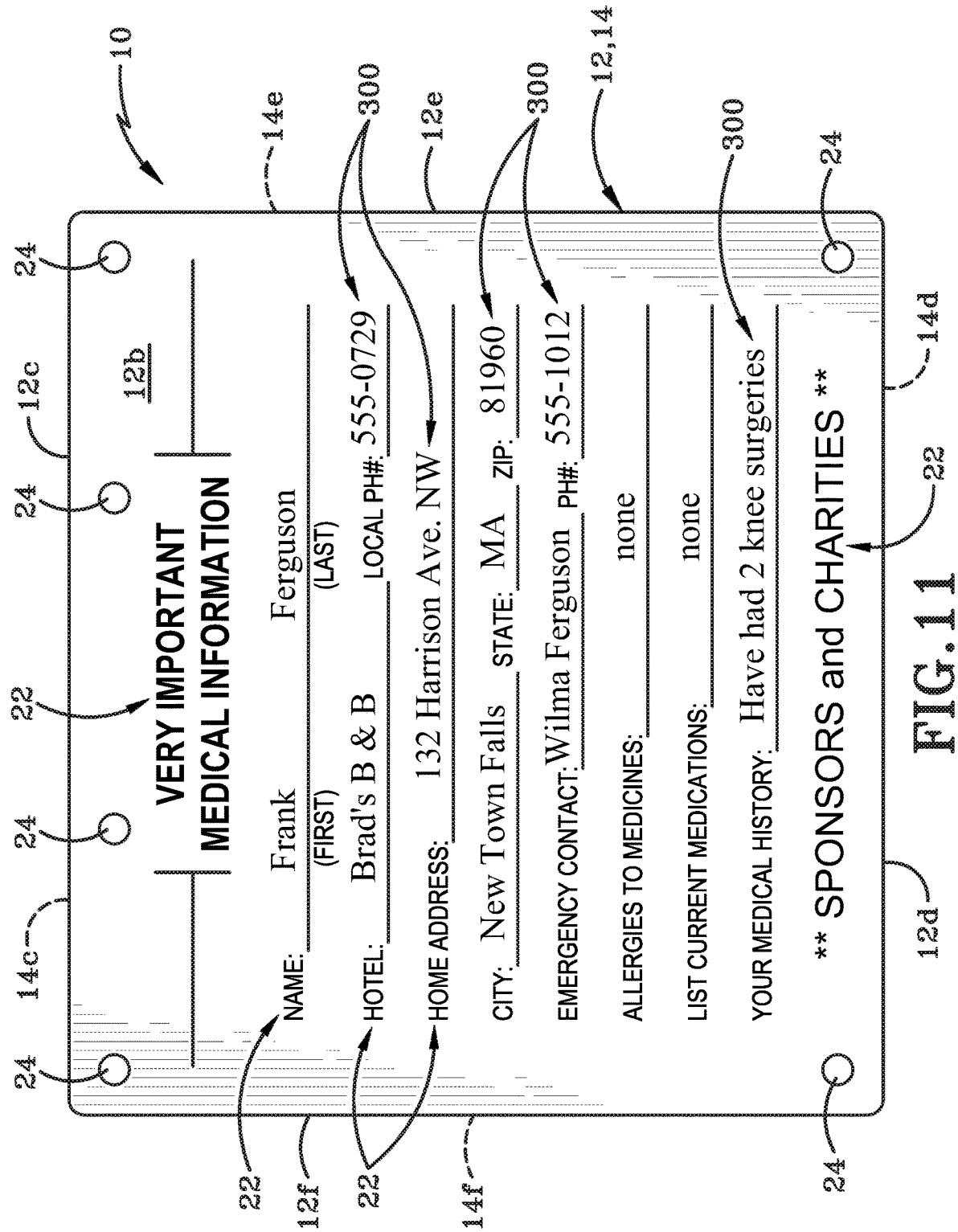
FIG. 11 is bottom plan view of the back surface of the race bib of FIG. 1 showing medical information of a specific competitor inserted therein.

FIGS. 3 and 11 show back surface 12b of first layer 12 of race bib 10 (or 110, 210 or 310) printed with indicia 22 that may be visually read by people without the aid of a computer. (Tag 18 includes information that is only computer readable.) Indicia 22 may comprise a blank form that is printed on lower surface 30b of first sheet of material 30 (or 130 or 230) by any of printers 32, 132, or 286. The competitor's personal information 300 may be filled in by the competitor once he or she receives racing bib 10, 110, 210, or 310 prior to the race. Alternatively, if each competitor's personal information 300 (FIG. 11) is known prior to production of a series of race bibs for a particular event, that personal information may be uploaded and printed on back surface 12b by the relevant digital printer at the same time that competitor numbers 34 printed onto the first sheet of material. That personal information, if known, may also be encoded into the tag 18 associated with that particular competitor's assigned race bib.

It will be understood that in some instances it may be preferably to roll sheet 48, 148, 248 up and ship the same to race officials in a roll instead of a stack. In this instance, lines of weakness should be formed in first and second sheets 130, 138 either before assembly or after bonding of first and second sheets 130, 138 into sheet 48, 148, 248. When a roll of race bibs is received, race officials will simply tear each bib from the roll as they assign particular competitors a particular competitor number and link that competitor number to the specific competitor in their computing system for tracking the race. In this particular instance, the cutter assembly 50, 150, 250 may be omitted and may be replaced by a roller assembly for forming sheet 48, 148, 248 into a roll.

It will be understood that in accordance with an aspect of the present disclosure the race bib disclosed herein is disposable after completion of the race in which the race bib is used to identify a competitor.

It will further be understood that while the race bib disclosed herein is specially designed to be secured to a competitor's clothing, a smaller version of the race bib may be secured to the competitor's shoes or may be formed into a bracelet or pendant or any other device that can be wrapped around a competitor's wrist or ankle or hung around the competitor neck, worn on a hat etc.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method of assembling a competition race bib comprising:
   providing a first layer having a front surface and a back surface, wherein the back surface of the first layer is adapted to comprise a back of a race bib and contact a competitor's body;
   providing a planar second layer having a front surface and a back surface, wherein the front surface of the first layer is adapted to comprise a front of the race bib;
   providing first indicia on the front surface of the first layer;
   positioning a tag on the front surface of the first layer; wherein the tag is programmable;
   applying the second layer over the front surface of the first layer, over the tag and over the first indicia;
   fixedly securing the second layer and first layer together;
   embedding the tag and the first indicia between the front surface of the first layer and the back surface of the second layer; and
   encoding the tag with data corresponding to the first indicia.

2. The method as defined in claim 1, wherein the providing of the first layer comprises:
   providing a layer of flashspun high-density polyethylene fiber material having a thickness of at least 6 mm measured from the front surface of the first layer through to the back surface of the first layer.

3. The method as defined in claim 1, wherein the providing of the first layer comprises:
   providing a layer of synthetic paper having a thickness of at least 6 mm measured from the front surface through to the back surface of the first layer.

4. The method as defined in claim 1, wherein the providing of the second layer comprises:
   providing a layer of polypropylene material.

5. The method as defined in claim 1, further comprising:
   providing a backer of constant thickness measured between a front surface of the back and a rear surface of the backer; and
   positioning the backer adjacent the tag.

6. The method as defined in claim 5, further comprising:
   positioning the backer between the tag and the first layer; or
   positioning the backer between the tag and the second layer.

7. The method as defined in claim 1, further comprising:
   printing second indicia on the rear surface of the first layer.

8. The method as defined in claim 7, wherein the providing of first indicia further includes providing a competitor number on the front surface of the first layer; and providing second indicia on the rear surface of the first layer includes providing personal information relating to an individual competitor associated with the competitor number provided on the front surface of the first layer.

9. The method as defined in claim 7, further comprising:
   simultaneously printing the second indicia on the rear surface of the first layer while the first indicia is being printed on the front surface of the first layer.

10. The method as defined in claim 1, wherein the fixedly securing of the first layer and second layer together comprises:
    positioning the tag on the front layer of the rear surface;
    positioning the rear surface of the second layer over the front surface of the first layer and over the tag and over the first indicia;
    applying heat to the first layer, the tag and the second layer;
    applying pressure to the first layer, the tag and the second layer; and
    thermally bonding the first layer and second layer together.

11. The method as defined in claim 1, wherein the fixedly securing of the first layer and second layer together comprises:
    applying an adhesive to one or both of the front surface of the first layer and the rear surface of the second layer;
    positioning the tag between the front surface of the first layer and the rear surface of the second layer;
    applying pressure to the first layer, the tag and the second layer; and
    adhesively bonding the front surface of the first layer to the rear surface of the second layer.

12. The method as defined in claim 1, wherein providing of the first indicia and the encoding of the tag include:
    passing the first layer into an ink printer;
    printing a competitor number on the front surface of the first layer with the ink printer;
    passing the first layer into a Radio Frequency Identification tag printer (RFID tag printer); and
    encoding a tag number into the tag using the RFID tag printer.

13. The method as defined in claim 12, further comprising:
    optically scanning the printed competitor number on the first layer after the first layer exits the ink printer; and
    transmitting the optically scanned competitor number to the RFID tag printer prior to encoding the tag number into the tag.

14. The method as defined in claim 13, further comprising:
    providing the tag on a backer strip;
    feeding the tag and backer strip into a tag applicator; and
    applying the tag and backer strip onto the first layer with the tag applicator.

15. The method as defined in claim 13, further comprising:
    providing the tag on a backer sheet;
    feeding the tag and backer sheet into a tag applicator; and
    applying the tag onto the first layer with the tag applicator.

16. The method as defined in claim 1, wherein providing of the first indicia and the encoding of the tag include:
    passing the first layer into a combined ink and RFID tag printer;
    printing a competitor number on the first surface of the first layer with the combined ink and RFID tag printer; and
    encoding a tag number into the tag using the combined ink and RFID tag printer.

17. The method as defined in claim 16, further comprising:
    providing the tag on a backer strip;
    feeding the tag and backer strip into the combined ink and RFID tag printer; and
    applying the tag and backer strip onto the first layer with the combined ink and RFID tag printer.

18. The method as defined in claim 16, further comprising:
    providing the tag on a backer sheet;

feeding the tag and backer sheet into the combined ink and RFID tag printer; and applying the tag onto the first layer with the combined ink and RFID tag printer.

19. The method as defined in claim 1, further comprising:

aligning a first side and a second side of the first layer with a first side and a second side of the second layer; and aligning a first end and a second end of the first layer with a first end and a second end of the second layer.

* * * * *